United States Patent
Stevens (10) Patent No.: US 7,197,127 B2
(45) Date of Patent: Mar. 27, 2007

(54) METHOD AND SYSTEM FOR PRIORITY BASED TELEPHONE CALL SCREENING

(75) Inventor: John Clarke Stevens, Littleton, CO (US)

(73) Assignee: Comcast Cable Holdings, LLC, Philadelphia, PA (US)

( * ) Notice: Subject to any disclaimer, the term of this patent is extended or adjusted under 35 U.S.C. 154(b) by 827 days.

(21) Appl. No.: 10/439,072

(22) Filed: May 15, 2003

(65) Prior Publication Data

US 2004/0228464 A1 Nov. 18, 2004

(51) Int. Cl.
*H04M 3/42* (2006.01)
(52) U.S. Cl. .......................... 379/207.15; 379/207.13; 379/208.01; 379/210.02
(58) Field of Classification Search ........... 379/201.01, 379/201.02, 201.03, 207.13, 207.15, 208.01, 379/210.02, 211.01
See application file for complete search history.

(56) References Cited

U.S. PATENT DOCUMENTS

| | | | |
|---|---|---|---|
| 4,277,649 A | | 7/1981 | Sheinbein |
| 5,329,578 A | * | 7/1994 | Brennan et al. ....... 379/211.03 |
| 5,467,388 A | * | 11/1995 | Redd et al. ............ 379/210.02 |
| 5,930,700 A | | 7/1999 | Pepper et al. |
| 6,005,870 A | * | 12/1999 | Leung et al. ................ 370/466 |
| 6,289,084 B1 | | 9/2001 | Bushnell |
| 2002/0131573 A1 | | 9/2002 | Berkley et al. |

FOREIGN PATENT DOCUMENTS

| EP | 0 837 611 A2 | 8/1997 |
|---|---|---|
| WO | WO 02/28079 A2 | 9/2001 |

OTHER PUBLICATIONS

Model 390 User Guide, pp. 1-18 © Aastra Telecon 2000, CC1857 Rev 01.

* cited by examiner

*Primary Examiner*—Bing Q. Bui
(74) *Attorney, Agent, or Firm*—Brooks Kushman P.C.

(57) ABSTRACT

Method and system for managing incoming telephone calls in which each incoming call is associated with a telephone number. A time constraint, a telephone use status, and a treatment option to associate with a priority code of a selected telephone number are selected. The priority code is assigned to each selected number based on the selected time constraint, telephone use status, and treatment option. If a number associated with an incoming call is a selected number, the priority code assigned to the selected number associated with the incoming call is determined based on the period of time at which the telephone receives the incoming call and based on the telephone use status during the time at which the telephone receives the incoming call. The incoming call is then managed according to the treatment option associated with the priority code assigned to the number associated with the incoming call.

25 Claims, 7 Drawing Sheets

| Phone Number 122 | Identity 126 | Day of Call 130 | | Time of Call 136 | | Phone Status (On or Off) 140 | Treatment Option 142 | Priority Code 146 |
|---|---|---|---|---|---|---|---|---|
| | | Beginning Day 132 | Ending Day 134 | Beginning Time 136 | Ending Time 138 | | | |
| 248-555-4400 ▽ 124 | Doe, John ▽ | Weekday ▽ | - ▽ | 8:AM ▽ | 5:PM ▽ | On Phone ▽ | Call Waiting ~110 ▽ | 1 ▽ |
| 248-555-4400 | John Doe Weekday Mornings 144 | Weekday | - | 8:AM | 5:PM | On Phone | Voicemail ~108 | 2 |
| 248-555-4400 | John Doe Evening | All | - | 5:PM | 10:PM | Off Phone | Pager ~102 | 3 |
| 248-555-4400 | Doe, John | Weekday | - | 5:PM | 10:PM | On Phone | Forward to Another Number | 4 |
| 248-555-4400 | Doe, John | Weekday | - | 10:PM | 8:AM | All | Block ~116 106 | 5 |
| 303-555-1234 | Doe, Jane | W | F | 8:AM | 12:PM | All | Forward to Mobile Phone | 6 |
| 303-555-1234 | Doe, Jane | M | W | Day | Day | Faxing | Voicemail 104 | 7 |
| 303-555-1234 | Doe, Jane | T | R | 8:AM | 5:PM | On Phone | Call Hold ~114 143 | 8 |
| 303-555-1234 | Doe, Jane | SA | SU | All | - | All | Forward to Tom's Cell | 9 |
| Not Listed | Unknown | All | - | All | - | All | Convert to e-mail ~112 | 10 |
| Emergency | Fire Dept. | All | - | All | - | All | Emergency | 1 |

METHOD AND SYSTEM FOR PRIORITY BASED TELEPHONE CALL SCREENING

BACKGROUND OF THE INVENTION

1. Field of the Invention

The present invention relates to a method and system operable for selectively treating incoming telephone calls to a telephone user by assigning a priority code to dictate a treatment option of the incoming telephone calls.

2. Background Art

Telephones have become a necessity in people's lives as a means of communication. However, an incoming telephone call may occasionally interfere or inconvenience a person's life. On the other hand, there may be other occasions when a person may not want to miss a particularly important telephone call. As such, people desire to control interference caused by telephone calls with their lives.

Telephone services are available for managing incoming telephone calls to a telephone user. The services may include blocking the incoming calls, routing the calls to an answering service, or forwarding the calls to another telephone line. However, these services treat all incoming calls in the same manner with no selectivity or precision.

U.S. Pat. No. 4,277,649 issued to Sheinbein (Sheinbein) provides a system for screening incoming telephone calls based upon the identity of the calling line. Sheinbein uses a switching office to hold a telephone user's screening memory for treatment of incoming telephone calls to a telephone of the telephone user. The set up of the system in Sheinbein is limited, time consuming, and inconvenient because the telephone user uses the telephone itself to set up the priority settings for treatment of incoming telephone calls to the telephone user's telephone.

Thus, there exists a need for a method and system that would allow a telephone user to easily select treatment options for incoming telephone calls to a telephone of the telephone user that offer more options, greater flexibility, and precision.

SUMMARY OF THE INVENTION

Accordingly, an object of the present invention is to provide a method and system that substantially obviates one or more of the problems due to the limitations and disadvantages of the related prior art.

In carrying out the above object and other objects, the present invention provides a method for managing incoming telephone calls to a telephone user's telephone. Each incoming telephone call is associated with a respective telephone number. The method includes selecting telephone numbers to assign a priority code, a time constraint, a telephone use status, and a treatment option. The time constraint, to associate with the priority code of each of the selected telephone numbers, is indicative of a possible period of time at which the telephone user's telephone receives an incoming telephone call associated with a selected telephone number. The time constraint may be further defined with a date constraint. The telephone use status, to associate with the priority code of each of the selected telephone numbers, is indicative of a possible status of the telephone user's telephone during the time at which the telephone user's telephone receives an incoming telephone call associated with a selected telephone number. The assigned priority codes and associated parameters for each of the selected telephone numbers are stored in a memory medium.

The present invention further provides a method to determine if a telephone number associated with an incoming telephone call to the telephone user's telephone is one of the selected telephone numbers. If the telephone number associated with the incoming telephone call is a selected telephone number, the present invention accesses the memory medium to determine the priority code and the associated parameters assigned to the incoming selected telephone number.

The present invention may provide a method for determining if the telephone number associated with the incoming telephone call is not one of the selected telephone numbers. The method selects a predetermined default treatment option for an incoming telephone call that is not one of the selected telephone numbers and manages the incoming telephone call according to the default treatment option.

The present invention may include a method for recognizing the incoming telephone call as an emergency telephone number and managing the incoming telephone call to all treatment options to ensure receipt by the telephone user. The emergency telephone number may be defined by the telephone user.

The present invention may include a method for assigning the incoming telephone call as the emergency telephone number when the telephone caller enters in a special priority code along with the placement of the incoming telephone call.

The treatment options may include forwarding an incoming telephone call associated with a selected telephone number to a voice mail system, a pager, a mobile telephone, a telephone user determined telephone number, or a call waiting system. The treatment options may further include converting an incoming telephone call associated with a selected telephone number directly to an e-mail system.

The present invention provides the telephone user with the telephone number associated with the incoming telephone call when the telephone user is using their telephone. The display may provide additional information about the incoming telephone call such as the identity of the telephone caller of the incoming telephone call and the treatment option for the incoming telephone call based upon the priority code. The display may provide the telephone user with override treatment options for the incoming telephone call. If the telephone user selects an override treatment option, the present invention will perform the override treatment option selected by the telephone user. If the telephone user does not respond to the step of offering, the present invention will perform the selected treatment option associated with the telephone number of the incoming telephone call.

The present invention provides a method of accessing an interactive internet website to assign a priority code to user selected telephone numbers. The method accesses the website to select the time constraint to associate with the priority code of each of the selected telephone numbers, to select the telephone use status to associate with the priority code of each of the selected telephone numbers, and to select the treatment option to associate with the priority code of each of the selected telephone numbers.

The present invention provides a method for accessing the memory medium to determine if the telephone number associated with an incoming telephone call to the telephone user's telephone is one of the selected telephone numbers. The present invention accesses the memory medium to manage the incoming telephone call according to the treatment option associated with the priority code assigned to the selected telephone number associated with the incoming telephone call.

The present invention may provide a method for accessing the memory medium to determine if the telephone number associated with the incoming telephone call is not one of the selected telephone numbers. The method may use a telephone service provider processor to select a predetermined default treatment option and to manage the incoming telephone call according to the default treatment option if the telephone number associated with the incoming telephone call is not one of the selected telephone numbers. The telephone service provider processor may be a web-based processor.

The present invention may provide a method for accessing the memory medium to recognize the incoming telephone call as an emergency telephone number and using the telephone service provider processor to manage the incoming telephone call to all treatment options to ensure receipt by the user. The user may access the website to define the emergency telephone numbers and store the emergency telephone numbers into the memory medium. The memory medium may be a web-based database.

Further, in carrying out the above objects and other objects, the present invention provides a method for managing incoming telephone calls to a telephone user's telephone, each incoming telephone call being associated with a respective telephone number. The method assigns priority codes to selected telephone numbers with a telephone user's telephone. The user may select a time constraint, a telephone use status, and a treatment option to associate with the priority code of each of the selected telephone numbers into the telephone user's telephone. The time constraint is indicative of a possible period of time at which the telephone user's telephone receives an incoming telephone call associated with a selected telephone number. The telephone use status is indicative of a possible status of the telephone user's telephone during the time at which the telephone user's telephone receives an incoming telephone call associated with a selected telephone number.

The present invention provides a method for assigning a priority code to each of the selected telephone numbers based on the selected time constraint, the selected telephone use status, and the selected treatment option. The method stores the priority code and associated parameters for each of the selected telephone numbers into a memory medium in the telephone user's telephone.

The present invention further provides a method for determining if a telephone number associated with an incoming telephone call to the telephone user's telephone is one of the selected telephone numbers. The present invention accesses the memory medium when the telephone number associated with the incoming telephone call is one of the selected telephone numbers to determine the priority code assigned to the selected telephone number associated with the incoming telephone call. The memory medium stores the priority code with the associated time constraint associated with the telephone number, the associated telephone use status associated with the telephone number, and the associated treatment option associated with the telephone number. The time constraint is the period of time at which the telephone user's telephone receives the incoming telephone call. The telephone use status is the status of the telephone user's telephone during the time at which the telephone user's telephone receives the incoming telephone call. The treatment option manages the incoming telephone call associated with the selected telephone number according to the treatment option associated with the priority code assigned to the selected telephone number associated with the incoming telephone call. The memory medium may be housed within the telephone user's telephone.

Also, in carrying out the above object and other objects, the present invention provides a system for controlling treatment of an incoming telephone call to a telephone user's telephone based upon a priority coding scheme determined by the telephone user. Each incoming telephone call is associated with a respective telephone number. The present invention provides a telephone user computer operable for enabling a telephone user to select telephone numbers to assign a priority code by selecting a time constraint, a telephone use status, and a treatment option to associate with the priority code. The time constraint is indicative of a possible period of time at which the telephone user's telephone receives an incoming telephone call associated with a selected telephone number. The telephone use status is indicative of a possible status of the telephone user's telephone during the time at which the telephone user's telephone receives an incoming telephone call associated with a selected telephone number.

The present invention includes an internet website at a telephone service provider. The website is operable for receiving from the telephone user computer the priority code for each of the selected telephone numbers. The present invention further includes a telephone service provider database operable with the website for storing the priority codes for each of the selected telephone numbers. The invention further provides a telephone service provider processor determines with the database if a telephone number associated with an incoming telephone call to the telephone user's telephone is one of the selected telephone numbers. The processor is further operable for managing the incoming telephone call according to the treatment option associated with the priority code assigned to the telephone number associated with the incoming call if the telephone number is a selected telephone number. The priority code is based on the period of time at which the telephone user's telephone receives the incoming telephone call and based on the telephone use status during the time at which the telephone user's telephone receives the incoming telephone call. The database may be web-based.

Still further, in carrying out the above object and other objects, the present invention provides a system for controlling treatment of an incoming telephone call to a telephone user's telephone based upon a priority coding scheme determined by the telephone user. Each telephone call is associated with a respective telephone number. The telephone has a touchscreen display operable for enabling a telephone user to select telephone numbers to assign a priority code. The telephone is further operable for selecting a time constraint, a telephone use status, and a treatment option to associate with the priority code. The time constraint is indicative of a possible period of time at which the telephone user's telephone receives an incoming telephone call associated with a selected telephone number. The telephone use status is indicative of a possible status of the telephone user's telephone during the time at which the telephone user's telephone receives an incoming telephone call associated with a selected telephone number.

The present invention provides a memory medium operable for storing the priority codes and associated parameters for each of the selected telephone numbers. The memory medium may be housed within the telephone. The present invention further provides a processor in the telephone operable for displaying the telephone number of an incoming telephone call on the touchscreen display. The processor determines if the telephone number of an incoming telephone call to the telephone is one of the selected telephone numbers. The processor is further operable for managing the incoming telephone call according to the treatment option associated with the priority code assigned to the selected telephone number associated with the incoming telephone call based on the period of time at which the telephone receives the incoming telephone call and based on the telephone use status during the time at which the telephone receives the incoming telephone call.

DETAILED DESCRIPTION OF THE PREFERRED EMBODIMENT(S)

Figure 1:
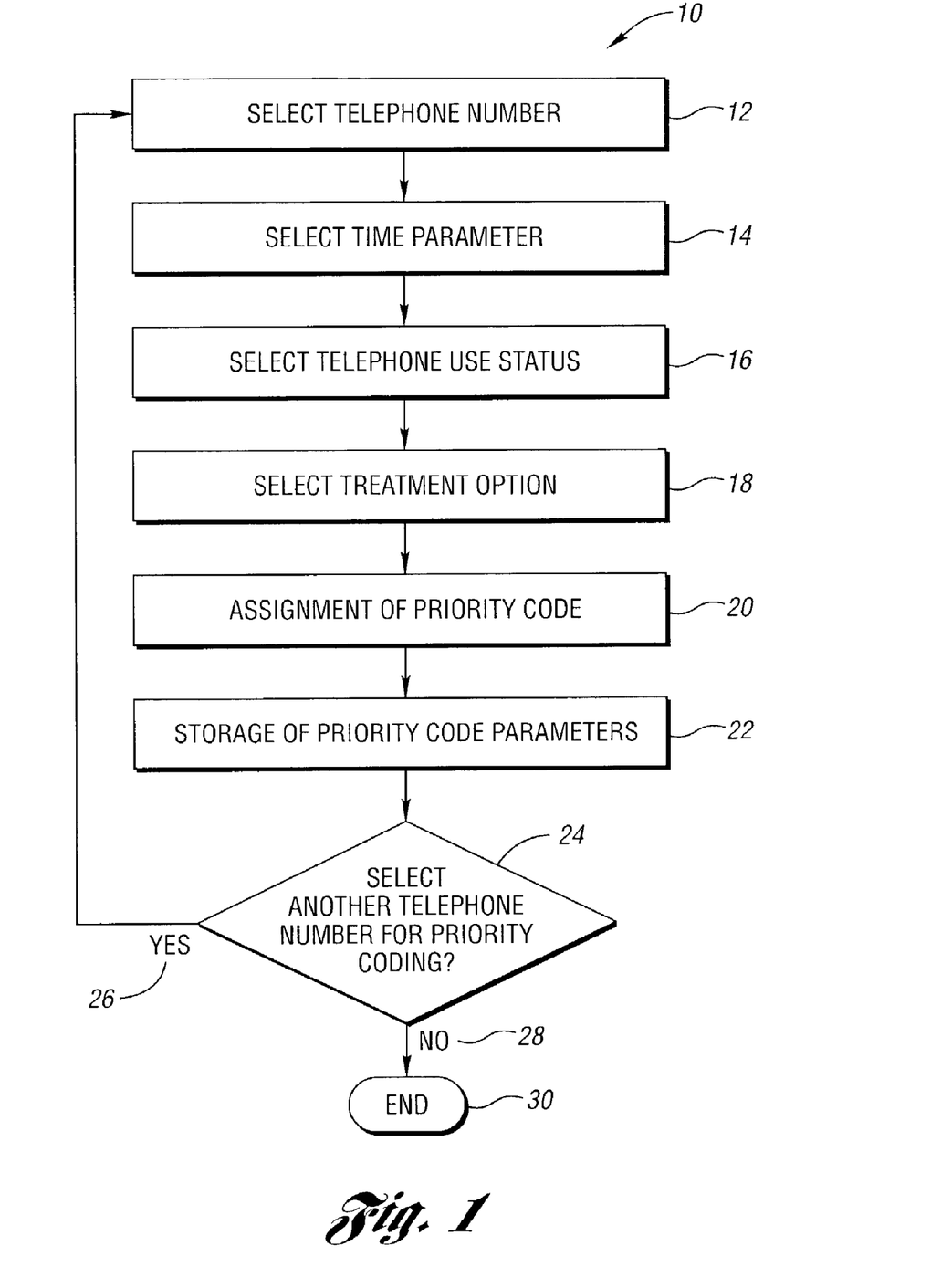
FIG. 1 is a flowchart diagram illustrating steps for the assignment of priority codes by a telephone user to selected telephone numbers associated with potential incoming telephone calls to a telephone of the telephone user in accordance with the method and system of the present invention.

Referring now to FIG. 1, a flowchart diagram 10 illustrating steps for the assignment of priority codes by a telephone user to selected telephone numbers of potential incoming telephone calls to a telephone of the telephone user in accordance with the method and system of the present invention is shown. In general, a telephone call incoming to a telephone of a telephone user (i.e., telephone callee) is associated with a telephone number. The telephone number of an incoming telephone call identifies the source (i.e., telephone caller) of the telephone call.

Flowchart 10 begins with the telephone user selecting a telephone number in step 12. The selected telephone number identifies the source of a potential incoming telephone call to a telephone of the telephone user. Next, the telephone user selects a time parameter to associate with the selected telephone number in step 14. The time parameter is typically given in the context of hours and minutes of a day. For instance, a selected time parameter may be 2:00 to 5:15 p.m. in a day.

In step 14 the telephone user can further define the selected time parameter by associating a date and/or day with the selected telephone number. For example, a date parameter may be the "15$^{th}$" and "30$^{th}$" of a month. Similarly, the day parameter may be Saturday and Sunday in a week. In step 14, the telephone user selects a beginning time parameter and an ending time parameter along with beginning and ending date parameters.

Next, the telephone user selects a telephone use status to associate with the selected telephone number in step 16. Telephone use status identifies if the telephone callee is using the telephone when an incoming telephone call arrives. The telephone use status parameter offers the user greater precision in dictating the treatment of incoming telephone calls. For example, the telephone use status may include the following states: on the telephone, off the telephone, call waiting, call on hold, faxing, and all statuses. The telephone user then selects a call treatment option to associate with an incoming telephone call associated with the selected telephone number in step 18. The treatment option for an incoming telephone call associated with the selected telephone number may include forwarding the incoming telephone call to a pager, forwarding the incoming telephone call to a mobile phone, forwarding the incoming telephone call to another telephone line of the telephone user, forwarding the incoming telephone call to a voice mail system, sending the incoming telephone call to a call waiting system, converting the incoming telephone call to an e-mail, putting the incoming telephone call on hold, blocking the telephone number of a caller, and the like.

A priority code according to the parameter selections made by the telephone user is then assigned to the selected telephone number in step 20. The priority coding may be set up in various ways. One embodiment is to have the system assign a priority number according to the parameters and treatment options selected by the telephone user. In this embodiment, a unique priority code may be automatically given by the system to each selected telephone number as a function of the treatment options and parameter selection.

Another embodiment for the priority coding is to have distinct priority codes and the telephone user selects the priority code to assign to the selected telephone number along with all the parameters. For example, priority codes can range from 1 through 10, with priority code 1 being the most important in terms of priority and priority code 10 being the least important. The telephone user selects a priority code to associate with the selected telephone number along with the other parameters. An incoming telephone call associated with the selected telephone number is then treated according to the parameters and the priority code chosen by the telephone user. In both embodiments, a selected telephone number can have several priority codes. The telephone a user may select different treatment parameters for the same telephone number resulting in several priority codes for that telephone number. For example, a number may have a priority code set higher for a call that is between 9:AM through 5:PM on weekdays, whereas a lower priority code may be set for a call from the same number from 9:PM through 6:AM on weekdays.

Next, the priority codes and the selected parameters for each of the selected telephone numbers are stored in a memory medium in step 22. The memory medium may be any storage memory device, database, or the like. The memory medium may be located in the telephone user's telephone or may be maintained in a telephone service provider database.

Next, the telephone user is then asked if they would like to select another telephone number for priority coding in step 24. If the telephone user chooses YES in step 26, steps 12 through 24 are then repeated. If the telephone user chooses NO in step 28, then flowchart 10 is finished in step 30.

Figure 2:
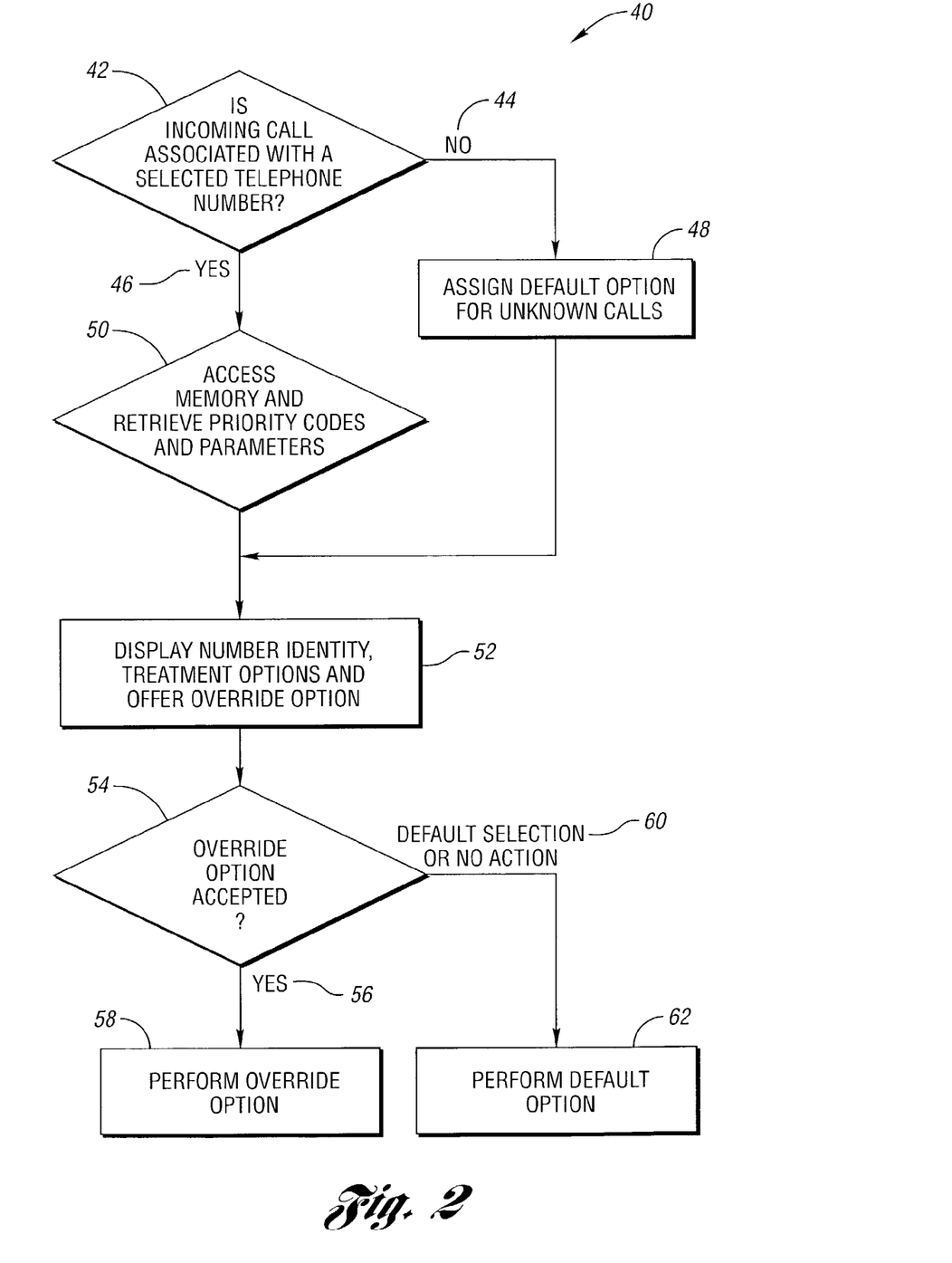
FIG. 2 is a flowchart diagram illustrating steps for the treatment of an incoming telephone call to the telephone of the telephone user in accordance with the method and system of the present invention.

FIG. 2 is a flowchart diagram 40 illustrating steps for the treatment of an incoming telephone call in accordance with the method and system of the present invention. Flowchart 40 first determines if the incoming telephone call is associated with a selected telephone number in step 42. If the incoming telephone call is not associated with a selected telephone number as determined in step 44, a default treatment option for non-selected telephone numbers is assigned to the incoming telephone call in step 46.

If the incoming telephone call is determined to be associated with a selected telephone number in step 48, the memory medium is then accessed to retrieve the treatment options and priority codes based on the parameters set by the telephone user in step 50.

In both scenarios of whether the incoming telephone call is associated with a selected telephone number or not, flowchart 40 continues with the touchscreen of the telephone of the telephone user displaying the number, identity, treatment options, and offer additional override options for the incoming telephone call in step 52. The override options would be the treatment options that are not the default selected treatment options.

Next, the system will determine in step 54 if the telephone user selects the override option, declines the override option, or takes no action. If the telephone user selects the override option in step 56, the system will perform the override treatment option selected by the telephone user in step 58.

If the telephone user does not select the default treatment option or does not respond in step 60, the system will perform the default treatment option in step 62. The amount of time before the system chooses the default treatment option based upon no response, can be adjusted by the telephone user such as from anywhere between 1 second to 5 minutes.

Figure 3:
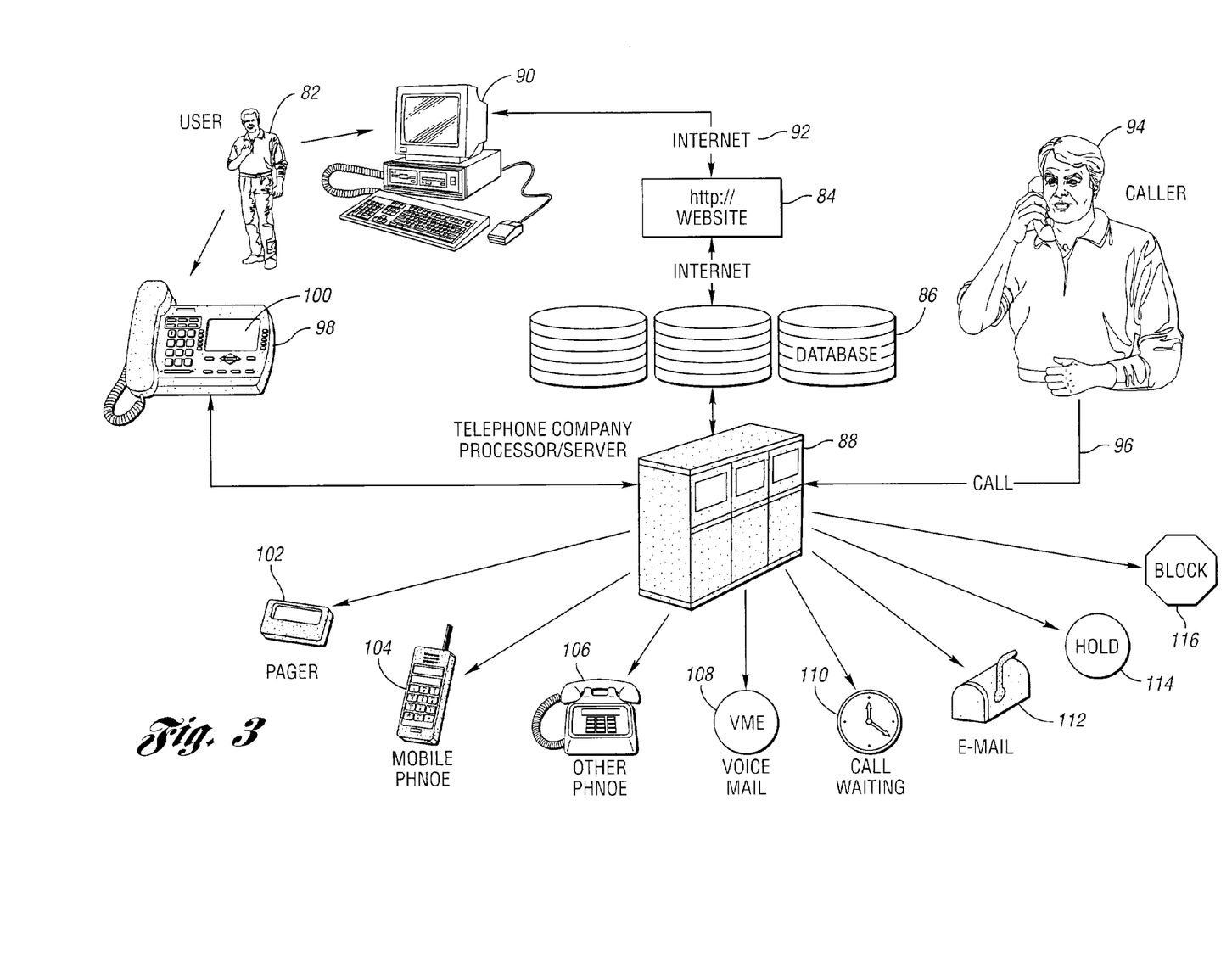
FIG. 3 is a schematic diagram illustrating a preferred hardware configuration on which the method and system of the present invention can be implemented.

FIG. 3 is a schematic diagram illustrating a preferred hardware configuration 80 on which the method and system of the present invention can be implemented. Configuration 80 includes a telephone user 82, a website 84, a memory database 86, and a telephone service provider processor 88 which interact with one another. A telephone user computer interface 90 interacts with website 84 via the internet 92. Telephone user 82 accesses computer interface 90 to select parameters and assign priority coding to selected telephone numbers.

A telephone service provider maintains website 84 and memory database 86. Telephone user 82 accesses website 84 to select parameters and assign priority codes for selected telephone numbers. The selected parameters and assigned priority codes are kept in memory database 86. Telephone service provider processor 88 accesses memory database 86 when an incoming telephone call 96 is received by telephone 98 of telephone user 82. Telephone service provider processor 88 manages the incoming telephone call according to the parameters and priority codes selected by telephone user 82.

For example, when a telephone caller 94 sends a telephone call 96 to telephone 98 of telephone user 82, incoming telephone call 96 is first delivered from telephone caller 94 to telephone service provider processor 88. Telephone service provider processor 88 determines the identification (i.e., determines the telephone number) of incoming telephone call 96. Telephone service provider processor 88 accesses memory database 86 to check if the telephone number associated with incoming telephone call 96 is a selected telephone number.

If the telephone number of incoming telephone call 96 is not a selected telephone number stored in memory database 86, telephone service provider processor 88 manages the incoming telephone call according to the telephone user defined treatment options for non-selected telephone numbers. However, if the telephone number of incoming telephone call 96 is a selected telephone number stored in memory database 86, telephone service provider processor 88 manages incoming telephone call 96 in accordance with the telephone user defined treatment options and/or assigned priority codes.

Prior to managing the incoming telephone call 96, telephone service provider processor 88 sends information to telephone 98 of telephone user 82. The information may contain the incoming caller identification, the incoming caller number, the incoming telephone number priority code, and the treatment option based on the parameters. Telephone 98 displays the information of incoming telephone call 96 along with overriding treatment options on touchscreen display 100 of the telephone. The overriding treatment options allow telephone user 82 to modify the management of incoming telephone call 96. Telephone service provider processor 88 will automatically default to the predefined treatment option if telephone user 82 does not give a response. However, if telephone user 82 selects an overriding treatment option, telephone service provider processor 88 performs the selected overriding treatment option.

The treatment options offered by telephone service provider processor 88 may include: forwarding incoming telephone call 96 to a pager 102, forwarding the incoming telephone call to a mobile phone 104, forwarding the incoming telephone call to another telephone 106, forwarding the incoming telephone call to a voice mail system 108, forwarding the incoming telephone call to call waiting 110, converting the incoming telephone call to an e-mail 112, putting the incoming telephone call on hold 114, or blocking the incoming telephone call 116.

The conversion of incoming telephone call 96 to an e-mail may be done in several ways. One method is to have an answering service that converts the information from telephone caller 96 to an e-mail message and then send the e-mail to telephone user's e-mail address 112. The answering service may have a person who takes the information from telephone caller 94 and then delivers the message through an e-mail 112 or to a text compatible pager 102.

Another method for e-mail conversion of incoming telephone call 96 is a program that converts the pertinent information from incoming telephone call 96 and delivers it as an e-mail 112 or to a text compatible pager 102. For example, when the e-mail conversion option is selected, telephone service provider processor 88 system sends an e-mail message with the telephone number associated with incoming telephone call 96, the identification of the incoming caller 94, the time of the telephone call, and the date of the telephone call.

The hold option 114 may be performed by telephone service provider processor 88 by first sending either a standard greeting or prerecorded message, i.e. "You are on hold, I will be with you shortly. Thank you." Then, telephone service provider processor 88 would put telephone caller 94 on hold. Touchscreen 100 would display information about incoming telephone call 96 put on hold and an option for telephone user 82 to pick up the line on hold or send to voice mail.

In another embodiment, caller 94 may enter in a priority code from a plurality of priority codes operable for dictating the treatment of outgoing telephone call 96 to the telephone user 82. Telephone service provider processor 88 manages call 96 according to the priority coding. For example, caller 94 may enter a priority code to designate outgoing telephone call 96 as an urgent telephone call. Processor 86 would treat call 96 according to telephone user 82 defined parameters for an urgent telephone call.

In yet another embodiment, telephone user 82 may assign priority coding to each unique caller 94. Caller 94 would enter in their priority coding during the placement of telephone call 96. Processor 88 would then treat the call according to the user defined parameters assigned to the associated priority code. Processor 88 may treat incoming telephone calls with no priority code according to a user 82 defined treatment option. Here, telephone caller 82 may be able to get priority treatment of their outgoing telephone call 96 to telephone user 82.

Figures 4, 5:
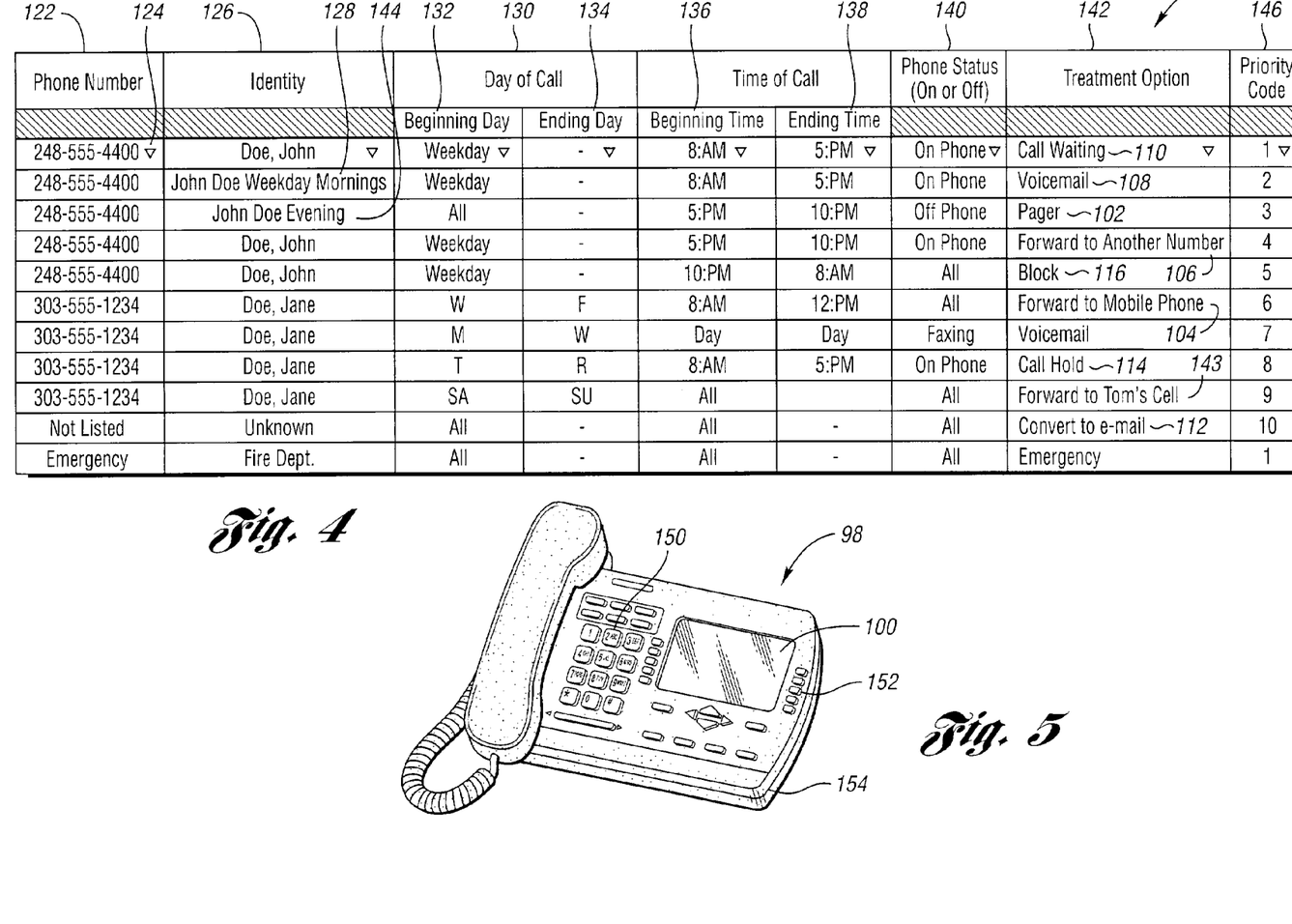
FIG. 4 is an web page screen display illustrating the assignment of priority codes and parameters to the selected telephone numbers by the telephone user.
FIG. 5 is a diagram illustrating a telephone of the telephone user on which the method and system of the present invention can be implemented.

FIG. 4 is a screen display table 120 illustrating the assignment of priority codes and parameters to selected telephone numbers. Screen display table 120 may be a web page, which may also serve as the basis for a memory lookup table or memory database 86. Telephone user 82 accesses screen display table 120 to select the parameters for priority coding of incoming telephone calls.

Column 122 entitled "Phone Number" of screen display table 120 displays the selected telephone numbers. Telephone numbers in column 122 may be selected with either a pull-down menu 124 or with input from telephone user 82. Column 126 entitled "Identity" displays an identification of the selected telephone numbers and the associated parameters. Identification in column 126 may be a default listing for the telephone number or defined by telephone user 82. For example, "John Doe Evening" 128 may be entered by telephone user 82 to show the identification and time of incoming call 96.

Next, telephone user 82 can select the date parameters in column 130 for each selected telephone number. Telephone user 82 can select a beginning day 132 and an ending day 134 for the treatment option for each selected telephone number. Columns 132 and 134 may also offer options such as selection for weekdays, weekends, or any preselected day constraints defined by the telephone user 82.

Column 135 offers telephone user 82 options for selecting beginning time 136 and ending time 138 for the treatment of the incoming telephone call. Columns 136 and 138 may offer default options such as: all day, afternoon, evenings, or any other time settings defined by the user.

Column 140 entitled "Phone Status" of screen table display 120 displays telephone use status 140 when an incoming telephone call is received. Telephone use status 140 offers telephone user 82 greater precision in dictating the treatment of incoming telephone calls 96. Telephone status of telephone user's 82 telephone 100 may be defined as: on the telephone, off the telephone, faxing, call waiting, or any combination of the four options as defined by user 82.

In column 142, telephone user 82 selects a treatment option for incoming telephone call 96 associated with the respective telephone number in column 122. Treatment options may be defined as: forwarding incoming telephone call 96 to a pager 102, forwarding incoming call to a mobile phone 104, forwarding the incoming telephone call to another telephone number 106, forwarding the incoming call to a voice mail system 108, forwarding the incoming telephone call to call waiting 110, converting the incoming telephone call to an e-mail 112, putting the incoming telephone call on hold 114, or blocking the incoming telephone call 116. Telephone user 82 may define the name of the treatment option in column 142. For example, user 82 may define a treatment option name to be "Forward to Tom's Cell" 143 to specify a treatment option to a specific mobile phone number and differentiate from another mobile phone number.

Telephone user 82 may review the selected parameters for the treatment of incoming telephone calls. Telephone user 82 may edit the identification for the selected telephone number to more specifically reference the treatment of the selected telephone call for that priority code listing. For example the user may define a telephone number as "John Doe evenings" 128 to depict the treatment of the selected telephone number in the evening and "John Doe weekday mornings" 144 to more clearly depict the treatment of the selected telephone number during weekday mornings.

Priority code 146 may be assigned either by the system or may be selected by the user. Assignment of the priority coding 146 can be executed as described earlier.

Telephone user 82 may continue to the next row of screen display table 120 to select different parameters for the same telephone number or choose another telephone number. Screen display table 120 may offer default options during the selection of parameters to make selection faster and may provide options in pull down menus 124.

FIG. 5 is a diagram illustrating a telephone 98 on which the method and system of the present invention may be implemented. Telephone 98 contains typical features found on a telephone, such as a number keypad 150, a touch screen display 100, and option buttons 152. Telephone 98 may contain memory medium 154 within the telephone.

Figure 6A:
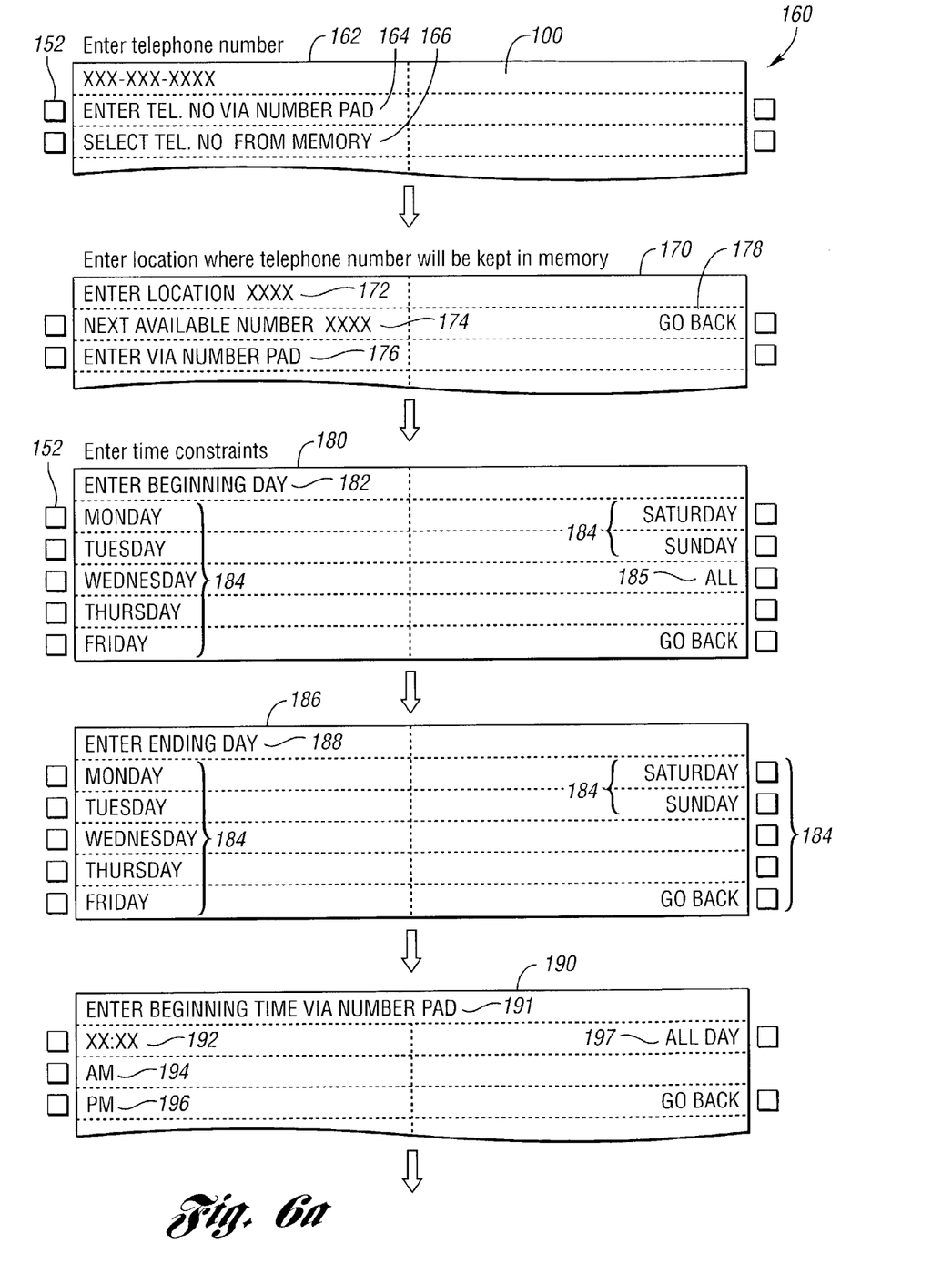
FIGS. 6a and 6b are flowchart diagrams illustrating telephone touchscreen displays operable for enabling the telephone user to assign parameters and priority codes to the selected telephone numbers.
Figure 6B:
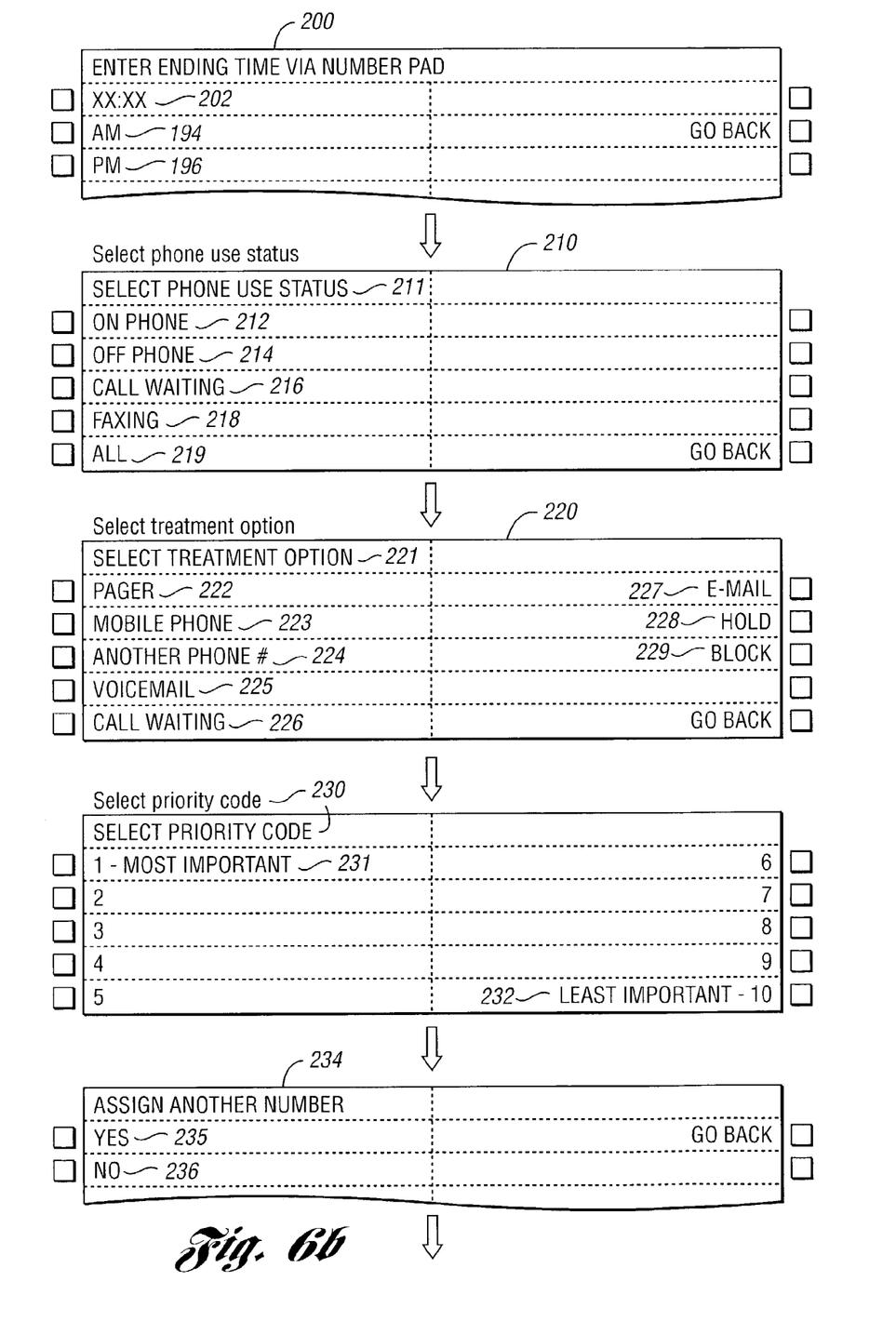

FIGS. 6a and 6b are flowchart diagrams 160 illustrating telephone touchscreen displays operable for enabling telephone user 82 to assign parameters and priority codes to selected telephone numbers. First, telephone user 82 selects a telephone number to assign a priority code in screen display 162. Screen display 162 may display several choices for inputting a telephone number such as entering the telephone number using number pad 164 or selecting a number that is already in telephone memory medium 166. Telephone user 82 may select options offered by pressing the corresponding option buttons 152 or selecting the option on touchscreen display 100.

Screen display 170 displays choices for selecting the memory location of the selected telephone number. The number of memory location numbers 172 is based upon the memory capability of telephone memory medium 154. Screen display 170 may offer next available location number in the memory medium 174 or a memory location may be entered using number pad 176. Note that throughout the selection process, touchscreen displays 100 will offer an option to "GO BACK" 178, when available. "GO BACK" option 178 allows telephone user 82 to go to the previous step or previous touchscreen display.

In screen display 180, telephone user 82 enters the beginning day constraint to associate with the selected telephone number. Screen display 180 requests telephone user 82 enter beginning day 182. Screen display 180 offers days of the week 184 with corresponding option buttons 168 or an option for choosing all days 185.

Screen display 186 offers telephone user 82 to enter ending day constraint 188. Screen display 186 offers the same options as screen display for the entering the beginning day 180. However, if telephone user 82 selects all days in beginning day display screen 180, ending day display screen 186 will not be offered.

In screen display 190, telephone user 82 is asked to enter beginning time constraint to associate with the selected telephone number using the number pad 191. Telephone user 82 enters beginning time 192 and then selects AM 194 or PM 196. Screen display 190 also offers telephone user 82 an option for choosing all day 197.

In screen display 200, telephone user 82 continues by entering ending time constraint 202 using the number pad. If telephone user 82 chooses all day option 197 in beginning time screen display 190, ending time screen display 200 will not be offered.

Screen display 210 requests telephone user 82 to select telephone use status 211. Telephone use statuses may include: on the phone 212, off the phone 214, call waiting 216, faxing 218, or all telephone use statuses 219.

In touchscreen display 220, telephone user 82 selects treatment option to associate with the selected telephone number 221. Treatment options may include: forwarding incoming telephone call 96 to a pager 222, forwarding the incoming telephone call to a mobile phone 223, forwarding the incoming telephone call to another telephone 224, forwarding the incoming telephone call to a voice mail system 225, forwarding the incoming telephone call to call waiting 226, converting the incoming telephone call to an e-mail 227, putting the incoming telephone call on hold 228, or blocking the incoming telephone call 229.

Screen display 230 may be offered when telephone user 82 selects priority coding to associate with selected telephone numbers. Screen display 230 may offer a choice of different levels of priority where 1 is most important 231 and 10 is least important 232.

The selected telephone number, priority code, and associated parameter will be stored in memory medium 154 of the telephone. The present invention will access the memory medium when an incoming telephone call arrives.

Screen display 234 asks telephone user 82 if they wish to assign another telephone number. If telephone user 82 selects YES 235, the system will go back to the screen display 162. If the user selects NO 236, the system will return to the main menu.

Figure 7:
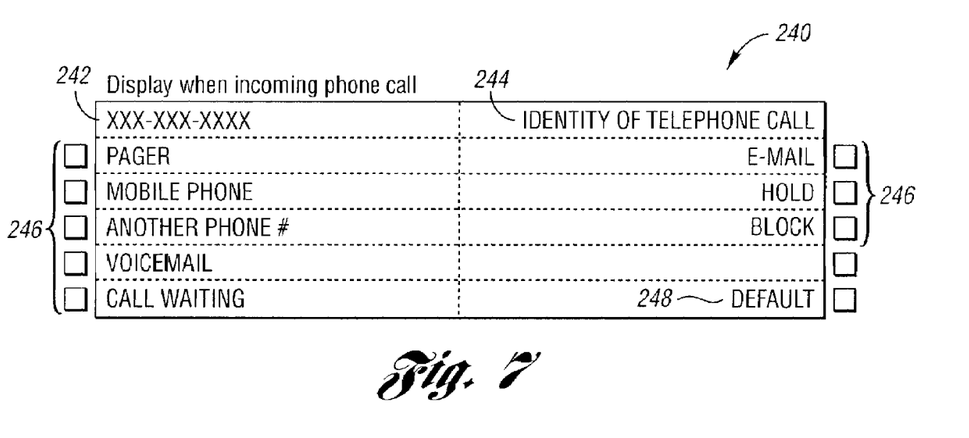
FIG. 7 is a telephone touchscreen display illustrating the screen presented when an incoming telephone call comes into the telephone of the telephone user.

FIG. 7 illustrates telephone touchscreen display when an incoming telephone call is received by telephone user's telephone 240. When an incoming telephone call is received, incoming telephone call touchscreen display 240 displays telephone number 242 and identity of the telephone number 244. Identity of the telephone number 244 can be defined by telephone user 82. Screen display 240 offers all available treatment options 246 and default option 248. Default option 248 is the treatment option that has been previously selected by the telephone user 82. If telephone user 82 does not take any action, then default option 248 may be executed within a user defined amount of time. However, if telephone user 82 selects another treatment option 246, the method and system will override and perform the selected treatment option.

Incoming emergency telephone numbers are given special treatment by the system. Emergency telephone numbers may include the fire department, the police department, or from a medical center, i.e. hospital. However, telephone user 82 may define emergency telephone numbers. For example, telephone user 82 can define the telephone numbers for parents or children as emergency numbers. The system recognizes an incoming emergency telephone call and performs all the treatment options to ensure that the telephone call is received by telephone user 82.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for managing incoming telephone calls to a telephone user's telephone, each incoming telephone call being associated with a respective telephone number, the method comprising:

selecting telephone numbers to assign a priority code to each of the selected telephone numbers;

selecting a time constraint to associate with the priority code of each of the selected telephone numbers, the time constraint being indicative of a possible period of time at which the telephone user's telephone receives an incoming telephone call associated with a selected telephone number;

selecting a telephone use status to associate with the priority code of each of the selected telephone numbers, the telephone use status being indicative of a possible status of the telephone user's telephone during the time at which the telephone user's telephone receives an incoming telephone call associated with a selected telephone number;

selecting a treatment option to associate with the priority code of each of the selected telephone numbers;

assigning a priority code to each of the selected telephone numbers based on the selected time constraint, the selected telephone use status, and the selected treatment option;

storing the assigned priority code for each of the selected telephone numbers in a memory medium;

determining if a telephone number associated with an incoming telephone call to the telephone user's telephone is one of the selected telephone numbers; and if the telephone number associated with the incoming telephone call is a selected telephone number, accessing the memory medium to determine the priority code assigned to the selected telephone number associated with the incoming telephone call based on the period of time at which the telephone user's telephone receives the incoming telephone call and based on the telephone use status during the time at which the telephone user's telephone receives the incoming telephone call; and managing the incoming telephone call according to the treatment option associated with the priority code assigned to the selected telephone number associated with the incoming telephone call.

2. The method of claim 1 further comprising:

determining if the telephone number associated with the incoming telephone call is not one of the selected telephone numbers;

selecting a predetermined default treatment option; and managing the incoming telephone call according to the default treatment option if the telephone number associated with the incoming telephone call is not one of the selected telephone numbers.

3. The method of claim 1 further comprising:

recognizing the incoming telephone call as an emergency telephone number; and managing the incoming telephone call according to all treatment options to ensure receipt by the telephone user.

4. The method of claim 3 wherein:

the emergency telephone number is defined by the telephone user.

5. The method of claim 4 wherein:
assigning the incoming telephone call as the emergency telephone number when a telephone caller enters in a special priority code during the placement of the telephone call; and
treating the incoming telephone call according to the priority code and the associated treatment option selected by the telephone user.

6. The method of claim 1 wherein:
the time constraint is further defined with a date constraint.

7. The method of claim 1 wherein:
the treatment option includes forwarding an incoming telephone call associated with a selected telephone number directly to a voice mail system.

8. The method of claim 1 wherein:
the treatment option includes forwarding an incoming telephone call associated with a selected telephone number directly to a pager.

9. The method of claim 1 wherein:
the treatment option includes forwarding an incoming telephone call associated with a selected telephone number directly to a mobile telephone.

10. The method of claim 1 wherein:
the treatment option includes converting an incoming telephone call associated with a selected telephone number directly to an e-mail system.

11. The method of claim 1 wherein:
the treatment option includes forwarding an incoming telephone call associated with a selected telephone number directly to a telephone user determined telephone number.

12. The method of claim 1 wherein:
the treatment option includes forwarding an incoming telephone call associated with a selected telephone number directly to a call waiting system.

13. The method of claim 1 wherein when the telephone user is using the telephone user's telephone and an incoming telephone call of a telephone caller having a selected telephone number is sent to the telephone user's telephone, the method further comprises:
displaying to the telephone user the telephone number associated with the incoming telephone call and displaying to the telephone user the identity of the telephone caller of the incoming telephone call;
displaying to the telephone user the treatment option for the incoming telephone call based upon the priority code assigned to the telephone number associated with the incoming telephone call;
offering to the telephone user an override treatment option for the incoming telephone call;
performing the override treatment option if selected by the telephone user; and
performing the treatment option associated with the telephone number of the incoming telephone call when the telephone user provides no response to the step of offering.

14. The method of claim 1 wherein:
the step of selecting telephone numbers includes accessing an interactive internet website to select the telephone numbers to assign a priority code to the selected telephone numbers;
the step of selecting a time constraint includes accessing the website to select the time constraint to associate with the priority code of each of the selected telephone numbers;
the step of selecting a telephone use status includes accessing the website to select the telephone use status to associate with the priority code of each of the selected telephone numbers;
the step of selecting a treatment option includes accessing the website to select the treatment option to associate with the priority code of each of the selected telephone numbers;
the step of determining includes accessing the memory medium to determine if the telephone number associated with an incoming telephone call to the telephone user's telephone is one of the selected telephone numbers; and
the step of managing the incoming telephone call includes accessing the memory medium to manage the incoming telephone call according to the treatment option associated with the priority code assigned to the selected telephone number associated with the incoming telephone call.

15. The method of claim 14 further comprising:
accessing the memory medium to determine if the telephone number associated with the incoming telephone call is not one of the selected telephone numbers;
using a telephone service provider processor to select a predetermined default treatment option; and
using the telephone service provider processor to manage the incoming telephone call according to the default treatment option if the telephone number associated with the incoming telephone call is not one of the selected telephone numbers.

16. The method of claim 15 further comprising:
accessing the memory medium to recognize the incoming telephone call as an emergency telephone number; and
using the telephone service provider processor to manage the incoming telephone call according to all treatment options to ensure receipt by the user.

17. The method of claim 16 further comprising:
using the website to define the emergency telephone numbers; and
storing the emergency telephone numbers into the memory medium.

18. The method of claim 14 wherein:
the memory medium is a web-based database.

19. The method of claim 15 wherein:
the telephone service provider processor is a web-based processor.

20. A method for managing incoming telephone calls to a telephone user's telephone, each incoming telephone call being associated with a respective telephone number the method comprising:
inputting telephone numbers to assign a priority code to the telephone numbers into a telephone user's telephone;
selecting a time constraint to associate with the priority code of each of the selected telephone numbers into the telephone user's telephone, the time constraint being indicative of a possible period of time at which the telephone user's telephone receives an incoming telephone call associated with a selected telephone number;
selecting a telephone use status to associate with the priority code of each of the selected telephone numbers into the telephone user's telephone, the telephone use status being indicative of a possible status of the telephone user's telephone during the time at which the telephone user's telephone receives an incoming telephone call associated with a selected telephone number;

selecting a treatment option to associate with the priority code of each of the selected telephone numbers into the telephone user's telephone;

assigning a priority code to each of the selected telephone numbers based on the selected time constraint, the selected telephone use status, and the selected treatment option;

storing the priority code for each of the selected telephone numbers into a memory medium in the telephone user's telephone;

determining if a telephone number associated with an incoming telephone call to the telephone user's telephone is one of the selected telephone numbers;

accessing the memory medium when the telephone number associated with the incoming telephone call is one of the selected telephone numbers to determine the priority code assigned to the selected telephone number associated with the incoming telephone call based on the period of time at which the telephone user's telephone receives the incoming telephone call and based on the telephone use status during the time at which the telephone user's telephone receives the incoming telephone call; and managing the incoming telephone call associated with the selected telephone number according to the treatment option associated with the priority code assigned to the selected telephone number associated with the incoming telephone call.

21. The method of claim 20 wherein:
the memory medium is housed within the telephone user's telephone.

22. A system for controlling treatment of an incoming telephone call to a telephone user's telephone based upon a priority coding scheme determined by the telephone user, each incoming telephone call being associated with a respective telephone number, the system comprising:

a telephone user computer operable for enabling a telephone user to select telephone number to assign a priority code, select a time constraint to associate with the priority code, the time constraint being indicative of a possible period of time at which the telephone user's telephone receives an incoming telephone call associated with a selected telephone number, select a telephone use status to associate with the priority code, the telephone use status being indicative of a possible status of the telephone user's telephone during the time at which the telephone user's telephone receives an incoming telephone call associated with a selected telephone number, and select a treatment option to associate with the priority code, wherein the telephone user computer assigns a priority code to each of the selected telephone numbers based on the selected time constraint, the selected telephone use status, and the selected treatment option;

an internet website at a telephone service provider, the website operable for receiving from the telephone user computer the priority code for each of the selected telephone numbers;

a telephone service provider database operable with the website for storing the priority codes for each of the selected telephone numbers; and a processor at the telephone service provider operable with the database for determining if a telephone number associated with an incoming telephone call to the telephone user's telephone is one of the selected telephone numbers, the processor further operable for managing the incoming telephone call according to the treatment option associated with the priority code assigned to the telephone number associated with the incoming call if the telephone number is a selected telephone number based on the period of time at which the telephone user's telephone receives the incoming telephone call and based on the telephone use status during the time at which the telephone user's telephone receives the incoming telephone call.

23. The system of claim 22 wherein:
the database is web-based.

24. A system for controlling treatment of an incoming telephone call to a telephone user's telephone based upon a priority coding scheme determined by the telephone user, each telephone call being associated with a respective telephone number, the system comprising:

a telephone having a touchscreen display operable for enabling a telephone user to select telephone numbers to assign a priority code, the telephone operable for selecting a time constraint to associate with the priority code, the time constraint being indicative of a possible period of time at which the telephone user's telephone receives an incoming telephone call associated with a selected telephone number, the telephone operable for selecting a telephone use status to associate with the priority code, the telephone use status being indicative of a possible status of the telephone user's telephone during the time at which the telephone user's telephone receives an incoming telephone call associated with a selected telephone number, and the telephone further operable for selecting a treatment option to associate with the priority code;

a memory medium operable for storing the priority codes for each of the selected telephone numbers; and a processor in the telephone operable for displaying the telephone number of an incoming telephone call on the touchscreen display, the processor operable for determining if the telephone number of an incoming telephone call to the telephone is one of the selected telephone numbers, the processor further operable for managing the incoming telephone call according to the treatment option associated with the priority code assigned to the selected telephone number associated with the incoming telephone call based on the period of time at which the telephone receives the incoming telephone call and based on the telephone use status during the time at which the telephone receives the incoming telephone call.

25. The system of claim 24 wherein:
the memory medium is housed within the telephone.

* * * * *

UNITED STATES PATENT AND TRADEMARK OFFICE
CERTIFICATE OF CORRECTION

PATENT NO. : 7,197,127 B2
APPLICATION NO. : 10/439072
DATED : March 27, 2007
INVENTOR(S) : John Clarke Stevens Page 1 of 1

It is certified that error appears in the above-identified patent and that said Letters Patent is hereby corrected as shown below:

In the Claims

In Column 13, Claim 10, Line 27:

"email system." has been replaced with -- email. --

Signed and Sealed this
Eleventh Day of March, 2014

Michelle K. Lee
*Deputy Director of the United States Patent and Trademark Office*